(12) United States Patent
Van Quekelberghe

(10) Patent No.: US 6,524,183 B1
(45) Date of Patent: Feb. 25, 2003

(54) GRAIN SENSOR ARRANGEMENT FOR AN AGRICULTURAL HARVESTER

(75) Inventor: Eric P. J. Van Quekelberghe, Moerkerke (BE)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 09/857,809

(22) PCT Filed: Nov. 24, 2000

(86) PCT No.: PCT/EP00/11802
§ 371 (c)(1),
(2), (4) Date: Jun. 11, 2001

(87) PCT Pub. No.: WO01/37632
PCT Pub. Date: May 31, 2001

(30) Foreign Application Priority Data

Nov. 26, 1999 (GB) .............................................. 9927839

(51) Int. Cl.[7] .............................................. A01F 12/00
(52) U.S. Cl. ...................................... 460/4; 56/10.2 C
(58) Field of Search ..................... 56/10.2 R, 10.2 C; 460/1, 4, 5, 119; 340/684

(56) References Cited

U.S. PATENT DOCUMENTS

| | | | | |
|---|---|---|---|---|
| 3,610,252 A | * | 10/1971 | De Coene et al. ............... | 460/1 |
| 4,036,065 A | * | 7/1977 | Strelioff et al. ................. | 460/5 |
| 4,230,130 A | * | 10/1980 | Staiert ............................. | 460/5 |
| 4,490,964 A | * | 1/1985 | Eldredge ........................ | 460/5 |
| 4,517,792 A | * | 5/1985 | Denning et al. ................. | 460/5 |
| 4,902,264 A | * | 2/1990 | Diekhans et al. ............... | 460/5 |
| 4,951,031 A | * | 8/1990 | Strubbe ....................... | 340/684 |
| 5,015,997 A | * | 5/1991 | Strubbe ....................... | 340/684 |
| 5,046,362 A | * | 9/1991 | Strubbe ....................... | 340/684 |
| 6,146,268 A | * | 11/2000 | Behnke et al. .................. | 460/4 |

FOREIGN PATENT DOCUMENTS

EP 0339140 A1 * 2/1989

* cited by examiner

Primary Examiner—Thomas B. Will
Assistant Examiner—Nathan Mammen
(74) Attorney, Agent, or Firm—John William Stader; Larry W. Miller

(57) ABSTRACT

A combine harvester comprises a threshing and separating arrangement mounted to a main frame and including a threshing or separating rotor co-operating with a curved threshing or separating concave. The harvester is provided with a grain sensor having a grain detection surface which is directed to a section of the concave for directly receiving part of the crop flow from the concave and to provide a signal indicative of the quantity of grain kernels in the crop flow. The plane of the detection surface and the plane tangent to the concave section intersect at an acute angle (β). This orientation deviates the crop material sideways, such that it does not tend to stick between the concave and the detection surface itself.

7 Claims, 3 Drawing Sheets

# GRAIN SENSOR ARRANGEMENT FOR AN AGRICULTURAL HARVESTER

TECHNICAL FIELD OF THE INVENTION

The present invention relates to agricultural harvesters and, more particularly, to means for sensing the presence of grain in a crop flow at a particular location inside the harvester.

BACKGROUND ART

The operator of a harvesting machine such as a combine harvester is seeking a high harvester speed while keeping crop losses at a reasonable level. Therefore he needs information on the amount of grain which does not reach the grain tank and is deposited onto the field is behind the combine. To this end the combine is provided with sensors adjacent the components which carry the straw and chaff to the outlet of the machine. For instance sensors may be provided at the end of the upper sieve and at the end of the separation apparatus, e.g. straw walkers or a separation concave as shown in EP-A-0.117.587. The sensors commonly comprise a sensing plate and an associated impact detector as illustrated by EP-A-0.339.142.

Similar sensors may also be used for providing an indication of the crop flow rate at various locations of the combine as described in EP-A-0.631.906.

It has been experienced that the grain detection signal from an impact sensor next to a separation concave is easily jammed. A position close to the concave seriously hampers the crop flow, such that the area between the concave and the detection surface may get plugged by straw particles. Eventually the grain kernels no longer impact the plate and no useful signal is received. A more remote position of the impact plate reduces the plugging risks, but also reduce the number of kernels that reach the plate, thereby diminishing the quality of the sensor signal.

Accordingly, there is a need for a sensor apparatus which, provides a good indication of the grain losses and which is not prone to plugging.

SUMMARY OF THE INVENTION

According to the present invention there is provided a combine harvester comprising:

a main frame;

a threshing and separating arrangement mounted to said main frame and including, a threshing or separating rotor co-operating with a curved threshing or separating concave; and a grain sensor having a grain detection surface, directed to a section of said concave to directly receive part of the crop flow from said concave and to provide a signal indicative of the quantity of grain kernels in said crop flow;

characterised in that said the plane of said detection surface and the plane tangent to said concave section intersect at an acute angle.

This arrangement provides for sideways deviation of the material flow from the concave such that it does not accumulate between the concave and the sensor surface. Any straw portions sticking through the concave mazes and held back by the sensor equally is forced sideways, thereby precluding false impact signals from the straw tips ticking again st the surface.

The intersecting angle may be substantially equal to 18°. The detection surface may also be inclined to both the horizontal and the vertical plane. Its central normal may extend through the axis of the rotor in order to receive an appropriate crop flow sample. The sensor may be disposed between the concave and an adjacent wall, where it is less subject to an air flow from the cleaning system. Preferably the sensor is attached to the frame or wall of the harvester by means of a support that has a minimal volume in order to prevent accumulation of stray material on the support. For instance the sensor may be mounted to a tubular support. The electrical conductors to the sensor may then be mounted inside the support, such that the crop material cannot hook behind.

DESCRIPTION OF THE FIGURES

A combine harvester in accordance with the present invention will now be described in greater detail, by way of example, with reference to the accompanying drawings, in which.

DETAILED DESCRIPTION OF AN EMBODIMENT OF THE INVENTION

The terms "grain", "straw" and "tailings" are used principally throughout this specification for convenience and it is to be understood that these terms are not intended to be limiting. Thus "grain" refers to that part of the crop material which is threshed and separated from the discardable part of the crop material which is referred to as "straw". Incompletely threshed crop material is referred to as "tailings". Also the terms "forward", "rearward", "left" and "right", when used in connection with the combine harvester and/or components thereof are determined with reference to the direction of forward operative travel of the combine harvester, but again, they should not be construed as limiting. The terms "longitudinal" and "transverse" are determined with reference to the fore-and-aft direction of the harvester and are equally not to be construed as limiting.

Figure 1:
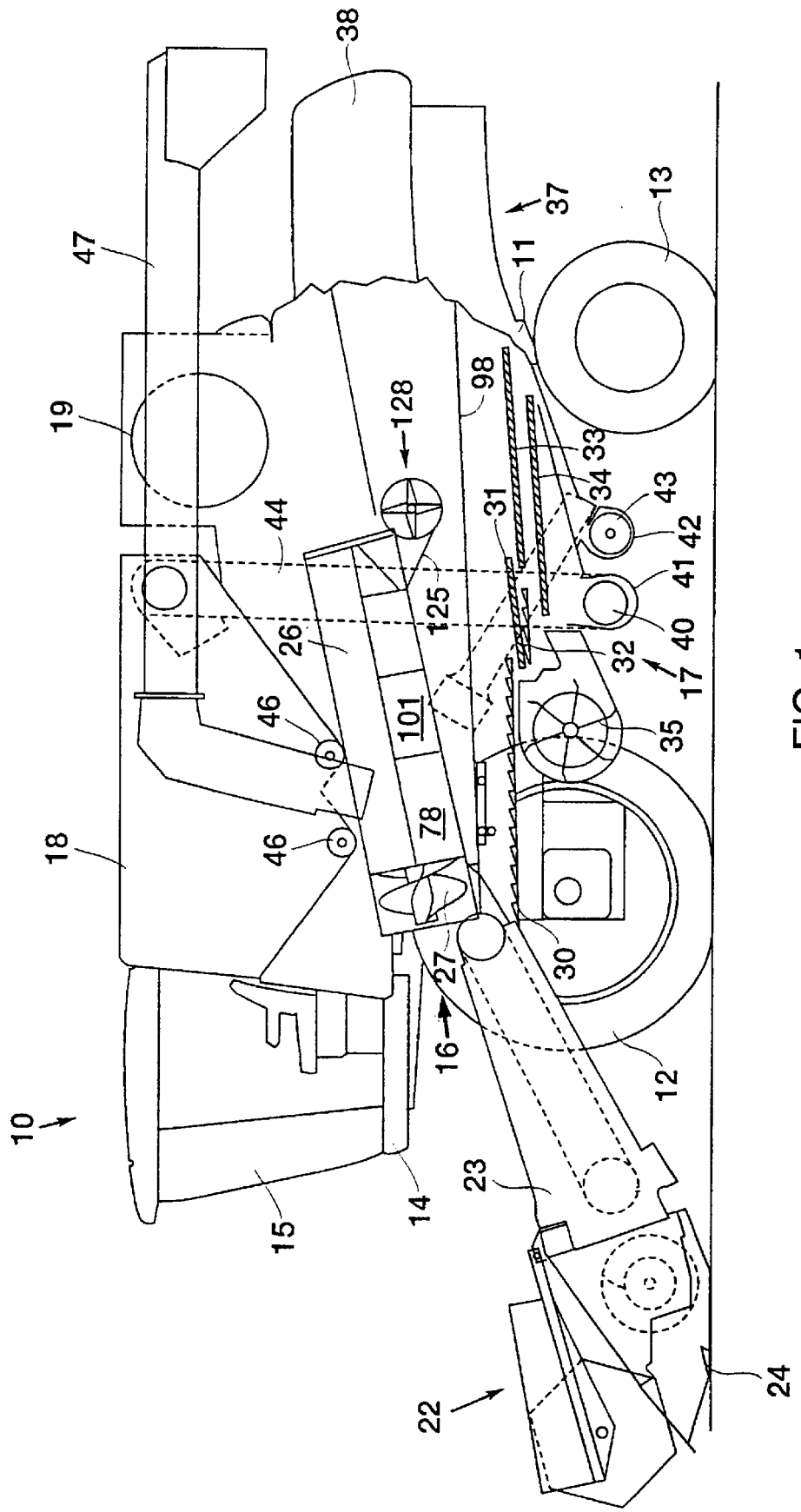
FIG. 1 is a diagrammatic, partly sectional side view of a combine harvester having an axial flow threshing and separating unit.

The combine harvester 10 shown in FIG. 1 of the accompanying drawings, is of the axial-flow type, wherein crop material is threshed and separated while it is advanced by and along a longitudinally arranged rotor. The combine harvester comprises a chassis or main frame 11 having a pair of driven, ground-engaging front wheels 12 and a pair of smaller, steerable rear wheels 13. Supported on the main frame 11 are an operator's platform 14 with an operator's cab 15, a threshing and separating assembly 16, a grain cleaning assembly 17, a grain tank 18 and a power plant or engine 19. A conventional header 22 and straw elevator 23 extend forwardly of the main chassis 11 and are pivotally secured thereto for generally vertical movement which is controlled by appropriate actuators, such as hydraulic cylinders (not shown).

As the combine harvester 10 is propelled forwardly over a field with standing crop, the latter is severed from the stubble by a sickle bar 24 at the front of the header 22, whereafter the header and the straw elevator 23 supply the cut crop to the threshing and separating assembly 16.

The threshing and separating assembly 16 comprises a pair of juxtaposed, generally cylindrical chambers 26 in which rotors 27 are rotated to thresh and separate the crop received therein, that is to say, the crop is rubbed and beaten between the rotors 27 and the inner surfaces of the chambers 26, whereby the grain, seed or the like, is loosened and separated from the straw. The chambers 26 are partly constituted by a separating concave assembly 101, comprising at least one concave 103 extending parallel to and below the rotor 27. The threshed straw is conveyed rearwardly to the outlet of the chamber 26 and deposited onto a slanting guide plate 125. A beater assembly 128 at the end of the guide plate engages the straw delivered thereto and propels it through an outlet 37 at the rear of the combine harvester 10.

Grain which has been separated by the threshing and separating assembly 16 falls onto a first grain pan 30 of the cleaning assembly 17 which further also comprises a pre-cleaning sieve 31, positioned above a second grain pan 32, a pair of sieves 33, 34, disposed the one above the other, and a cleaning fan 35.

The grain pans 30, 32 and the sieves 31, 33, 34 are oscillated generally back-and-forth for transporting threshed and separated grain from the first grain pan 30 to the pre-cleaning sieve 31 and the second grain pan 32 and therefrom to the sieves 33, 34. The same oscillatory. movement spreads said grain across said sieves 31, 33, 34, while permitting the passage of cleaned grain by gravity through the apertures of these sieves. The grain on the sieves 31, 33, 34 is subjected to a cleaning action by the fan 35 which provides an air flow through said sieves to remove chaff and other impurities such as dust from the grain by making this material airborne for discharge from the machine through the outlet 37 of the straw hood 38.

Clean grain falls to a clean grain auger 40 in a clean grain auger trough 41 and is subsequently transferred therefrom by a grain elevator 44 to the grain tank 18. Tailings fall to a tailings auger (not shown) in a tailings auger trough 42. The tailings are transported sideways by said tailings auger to a separate rethresher 43 and returned by a tailings conveyor to the cleaning assembly 17 for repeated cleaning action.

A pair of grain tank augers 46 at the bottom of the grain tank 18 is used to urge the clean grain sideways to an unloading tube 47 for discharge from the combine harvester 10.

Figure 2:
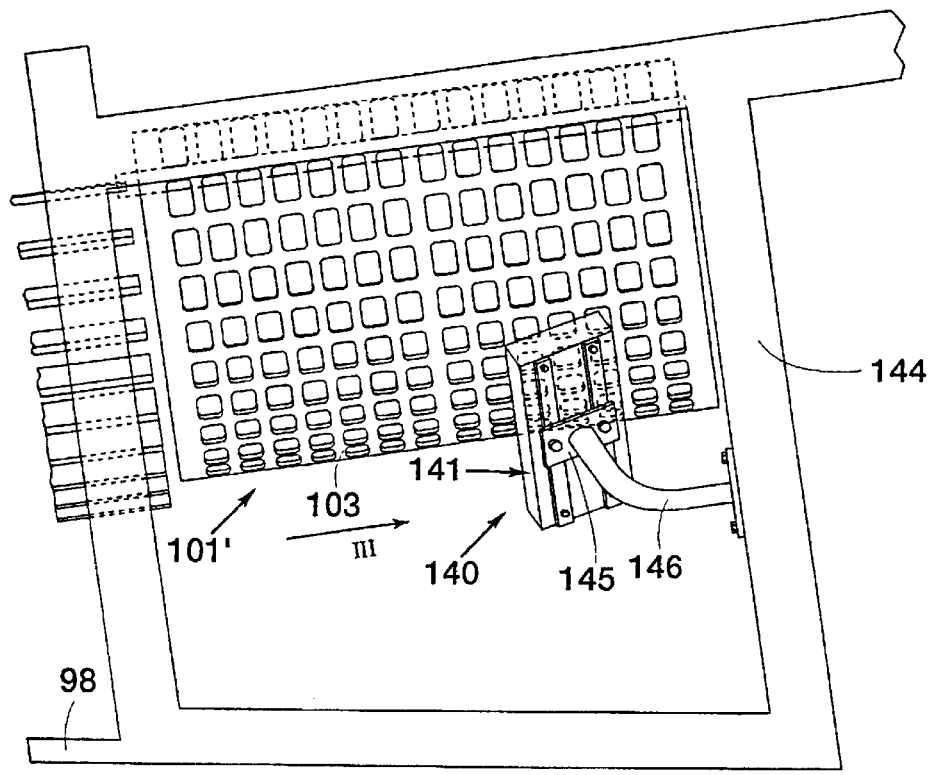
FIG. 2 is an enlarged side view of the harvester of FIG. 1, after removal of a side panel, showing the position of a grain sensing device directed to the separating unit.
Figure 3:
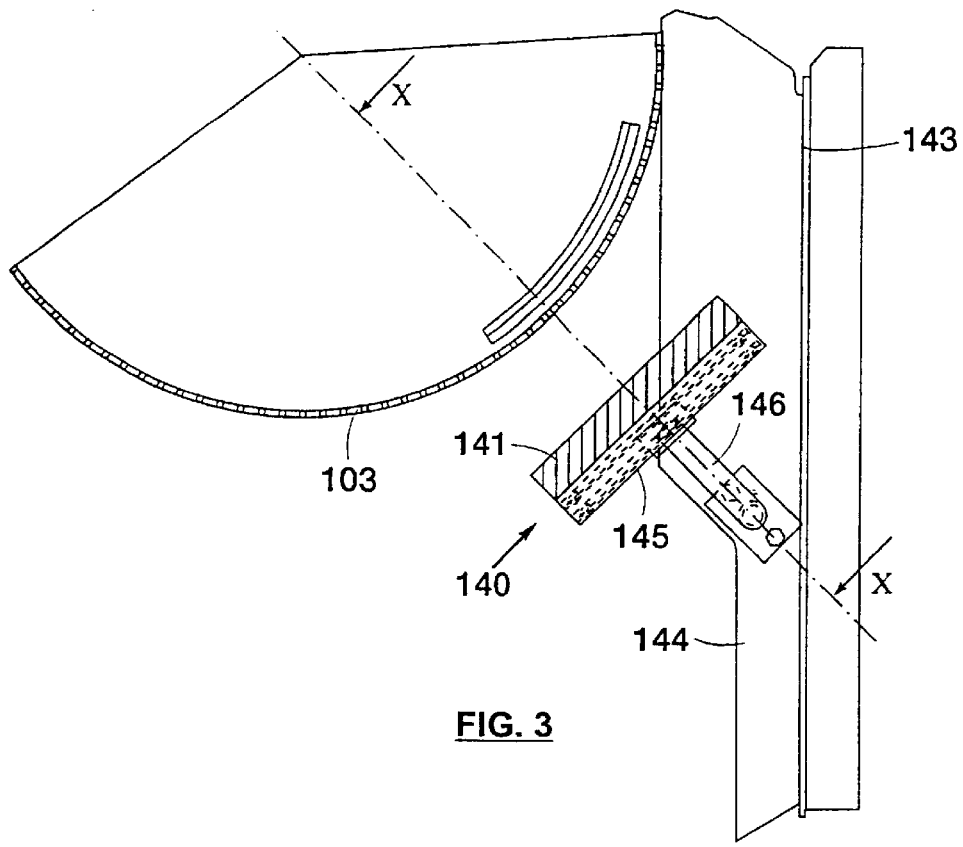
FIG. 3 is a front view of the grain sensing device taken in the direction of arrow III of FIG. 2.
Figure 4:
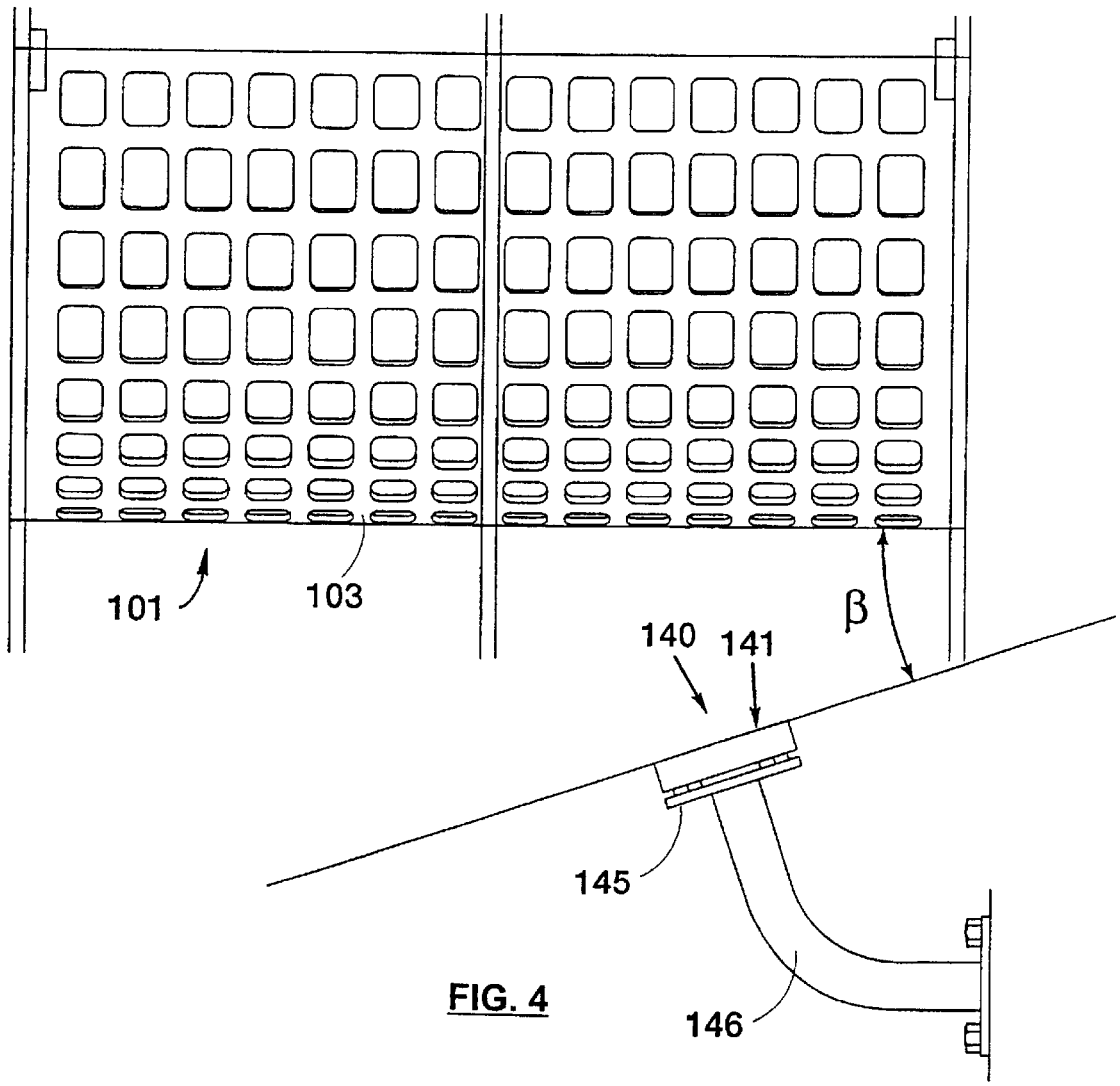
FIG. 4 is a cross section of the grain sensing device and the separating unit along line X—X of FIG. 3.

The operator usually wants to harvest a field at a high ground speed while maintaining the grain losses at a reasonable level. Therefore he wishes to be informed continuously on the level of these losses. To this end a grain sensor 140 is installed adjatent the rear end of the separating concave assembly 101, as shown in FIGS. 2–4. The sensor 140 has a detection surface 141 which is directed generally to the last separating grate 103 (or 102, as the case may be). When combine settings are optimal for the current crop conditions, hardly any grain should be present in the material which the rotor 27 propels through the mazes of the grate 103. Part of this material hits the detection surface 141 and any kernels therein generate an electrical signal which is transformed by appropriate electronic circuitry into a grain loss signal. It is well known in the art to use sensor plates comprising a piezo-electrical crystal which generates a pulse signal when hit by a kernel. The amount of grain separated from the straw in this section of the harvester 10 has a close correlation with the grain content of the remaining crop material which is delivered to the beater assembly 128 and also with the amount of grain which is finally deposited by this beater assembly 128 onto the field.

The detection surface 141 is located close to the rear of the grate 103, sufficiently remote from the cleaning assembly 16 to preclude false detections resulting from debris from the grain pan 30 and the sieves 31, 33, blown upwardly by the cleaning fan 35 and hitting the surface 141. Furthermore the sensor 140 is installed adjacent a side wall 143, in a calm area where there are no high wind velocities.

The detection surface 141 is not parallel to the adjacent section of the grate 103. As shown in FIG. 4 this surface is disposed at an acute and $\beta$ to the plane tangent to the nearest grate section. Preferably this angle $\beta$ is substantially equal to 18°. The central normal of the detection surface 141 extends through the axis of the rotor 27, forward of the position of the grain sensor 140 itself. In this manner the detection surface 141 receives an almost direct blast of crop material from the grate 103, but because of its inclined position, the surface deviates this crop material forwardly. This is particularly advantageous when there is a tendency for straw stems to bridge between the grate mazes and the grain sensor 140. Otherwise the tips of the straw stalks vibrate for a longer or shorter period against the detector surface 141, thereby causing false detections. The inclined disposition now immediately deviates such stalks forwardly.

Furthermore the surface 141 is mounted at angle to the horizontal plane such that there is no tendency for straw and chaff to rest thereon and to shield the surface from newly arriving crop material. This angle may be substantially equal to 45° as illustrated in FIG 18.

The grain sensor 140 is mounted to an upright beam 144 of the frame 11 by means of a support 145. The support) comprises a bent tube 146 which is connected at the middle of the rear plate of the sensor surface 141. The upper portion of the tube is perpendicular to this surface such that it, is shielded completely from the material passing through the grate 103. This arrangement and the small diameter of the support tube 146 prevent the accumulation of stray material around the sensor 140 such that all threshed and separated material can find its way to the cleaning assembly 17. To further minimise the chances of material building up around the grain sensor 140, its conductors providing the sensor signal to the electronic circuitry are mounted inside the tube 146 and the beam 144.

This sensor arrangement has been described with reference to an axial flow combine, but it can also be used advantageously in other types of combines, e.g. in conventional combines having transversely arranged threshing, beater and/or separator drums.

What is claimed is:

1. A combine harvester comprising:

a main frame;

a threshing and separating arrangement mounted to said main frame and including a threshing or separating rotor co-operating with a curved threshing or separating concave; and a grain sensor having a generally planar grain detection surface with the central normal of the plane of said detection surface extending through the axis of said rotor at a location forward of the position of said grain sensor such that said detection surface will be directly hit by part of the crop flow from said concave and thereby provide a signal indicative of the quantity of grain kernels in said crop flow;

wherein the plane of said detection surface and the plane tangent to said concave section intersect at an acute angle (β) and said detection surface is inclined with respect to the horizontal and the vertical plane such that said detection surface is not directly below said concave.

2. The combine harvester described claim 1, wherein said acute angle (β) is substantially equal to 18°.

3. The combine described in claim 1, wherein the grain sensor is disposed substantially between said concave and an adjacent wall.

4. The combine harvester described in claim 3, wherein the grain sensor is attached perpendicularly to the end of a tubular support.

5. The combine harvester described in claim 4, wherein the electrical conductors to said grain sensor are mounted inside said tubular support.

6. The combine harvester described in claim 5, wherein the harvester is an axial flow combine and said sensor is disposed near the end of the separating concave.

7. A combine harvester comprising:

a main frame;

a threshing and separating arrangement mounted to said main frame and including a threshing or separating rotor co-operating with a curved threshing or separating concave;

a grain sensor having a generally planar grain detection surface with the central normal of the plane of said detection surface extending through the axis of said rotor at a location forward of the position of said grain sensor such that said detection surface will be directly hit by part of the crop flow from said concave and thereby provide a signal indicative of the quantity of grain kernels in said crop flow, the plane of said detection surface and the plane tangent to said concave section intersecting at an acute angle (β); and said detection surface is inclined with respect to the horizontal and the vertical plane such that said detection surface is not directly below said concave.

* * * * *